US012683377B2

(12) United States Patent
Akahane

(10) Patent No.: US 12,683,377 B2
(45) Date of Patent: Jul. 14, 2026

(54) DEVICE, SEMICONDUCTOR APPARATUS, GATE DRIVER, AND POWER MODULE

(71) Applicant: FUJI ELECTRIC CO., LTD.,
Kanagawa (JP)

(72) Inventor: Masashi Akahane, Matsumoto-city (JP)

(73) Assignee: FUJI ELECTRIC CO., LTD.,
Kanagawa (JP)

( * ) Notice: Subject to any disclaimer, the term of this patent is extended or adjusted under 35 U.S.C. 154(b) by 0 days.

(21) Appl. No.: 18/752,754

(22) Filed: Jun. 24, 2024

(65) Prior Publication Data

US 2024/0348037 A1 Oct. 17, 2024

Related U.S. Application Data

(62) Division of application No. 17/890,244, filed on Aug. 17, 2022, now Pat. No. 12,027,842.

(30) Foreign Application Priority Data

Oct. 5, 2021 (JP) ................................. 2021-164148

(51) Int. Cl.
*H02H 3/08* (2006.01)
*H02H 9/02* (2006.01)
*H02M 7/08* (2006.01)

(52) U.S. Cl.
CPC ................ *H02H 3/08* (2013.01); *H02M 7/08* (2013.01)

(58) Field of Classification Search
CPC ................................... H02H 3/08; H02M 7/08
USPC ....................................................... 361/93.1
See application file for complete search history.

(56) References Cited

U.S. PATENT DOCUMENTS

| | | | |
|---|---|---|---|
| 2,932,781 A | 4/1960 | Jensen | |
| 3,031,653 A | 4/1962 | Bowar | |
| 3,328,692 A * | 6/1967 | Lyon ................. | G01R 31/2632 |
| | | | 324/133 |

(Continued)

FOREIGN PATENT DOCUMENTS

| | | |
|---|---|---|
| JP | S4870133 U | 9/1973 |
| JP | 2000068458 A | 3/2000 |

(Continued)

OTHER PUBLICATIONS

Those references were submitted as IDS or found by the examiner over the earlier U.S. Appl. No. 17/890,244, filed Aug. 17, 2022.

(Continued)

*Primary Examiner* — Crystal L Hammond
*Assistant Examiner* — Lucy M Thomas

(57) ABSTRACT

Provided is a device including a series circuit in which a rectifying element and a fuse element are connected in series, in which one end on an anode side of the rectifying element in the series circuit is connected to a first connection point having a reference potential, and another end on a cathode side of the rectifying element in the series circuit is connected to a second connection point that is to have a potential higher than the reference potential. The device may further include a parallel circuit in which a plurality of the series circuits is connected in parallel. A rectifying characteristic of the rectifying element in at least one of the series circuits connected in parallel may be different from a rectifying characteristic of the rectifying element in at least another one of the series circuits connected in parallel.

9 Claims, 5 Drawing Sheets

(56)                    References Cited

U.S. PATENT DOCUMENTS

| | | | | |
|---|---|---|---|---|
| 5,253,208 | A | * | 10/1993 | Kang ................... G11C 29/835 |
| | | | | 365/201 |
| 5,319,344 | A | | 6/1994 | Mosesian |
| 2015/0015218 | A1 | * | 1/2015 | Hu .......................... G01R 31/40 |
| | | | | 323/234 |
| 2018/0088155 | A1 | | 3/2018 | Clarke |
| 2018/0096807 | A1 | * | 4/2018 | Yang ...................... H02H 3/023 |
| 2018/0188313 | A1 | | 7/2018 | Paikin |
| 2019/0149063 | A1 | | 5/2019 | Onda |
| 2021/0280515 | A1 | | 9/2021 | Iwamizu |

FOREIGN PATENT DOCUMENTS

| | | | |
|---|---|---|---|
| JP | 2007053876 | A | 3/2007 |
| JP | 2010219438 | A | 9/2010 |
| JP | 2014204602 | A | 10/2014 |
| JP | 2017131017 | A | 7/2017 |
| JP | 2018102108 | A | 6/2018 |
| JP | 2020047934 | A | 3/2020 |
| WO | 2017217036 | A1 | 12/2017 |

OTHER PUBLICATIONS

Office Action issued for counterpart Japanese Application No. 2021-164148, transmitted from the Japanese Patent Office on Jul. 8, 2025 (drafted on Jul. 1, 2025).
Office Action issued for related Japanese Application No. 2025-147944, transmitted from the Japanese Patent Office on May 26, 2026 (drafted on May 19, 2026).

* cited by examiner

DEVICE, SEMICONDUCTOR APPARATUS, GATE DRIVER, AND POWER MODULE

CROSS-REFERENCE TO RELATED APPLICATIONS

This application is a divisional of U.S. patent application Ser. No. 17/890,244, filed on Aug. 17, 2022, the entire contents of which are explicitly incorporated herein by reference. The application also claims priority from the following Japanese patent application, which is explicitly incorporated herein by reference:

No. 2021-164148 filed in JP on Oct. 5, 2021

BACKGROUND

1. Technical Field

The present invention relates to a device, a semiconductor apparatus, a gate driver, and a power module.

2. Related Art

Patent document 1 describes: "an ESD protection circuit for a fuse element in a semiconductor apparatus is achieved".

LIST OF CITED REFERENCES

Patent Document

Patent document 1: Japanese Patent Application Publication No. 2014-204602

SUMMARY

According to a first aspect of the present invention, there is provided a device. The device may include a series circuit in which a rectifying element and a fuse element are connected in series. One end on an anode side of the rectifying element in the series circuit may be connected to a first connection point having a reference potential, and another end on a cathode side of the rectifying element in the series circuit may be connected to a second connection point that is to have a potential higher than the reference potential.

The device may further include a parallel circuit in which a plurality of the series circuits is connected in parallel.

A rectifying characteristic of the rectifying element in at least one of the series circuits connected in parallel may be different from a rectifying characteristic of the rectifying element in at least another one of the series circuits connected in parallel.

Each of the rectifying element in the at least one of the series circuits and the rectifying element in the at least another one of the series circuits may have a P-N junction. A junction area of the P-N junction in the at least one of the series circuits may be different from a junction area of the P-N junction in the at least another one of the series circuits.

A melting characteristic of the fuse element in the at least one of the series circuits may be the same as a melting characteristic of the fuse element in the at least another one of the series circuits.

A melting characteristic of the fuse element in at least one of the series circuits connected in parallel may be different from a melting characteristic of the fuse element in at least another one of the series circuits connected in parallel.

A rectifying characteristic of the rectifying element in the at least one of the series circuits may be the same as a rectifying characteristic of the rectifying element in the at least another one of the series circuits.

According to a second aspect of the present invention, there is provided a device. The device may include a parallel circuit in which a plurality of series circuits is connected in parallel, each of the plurality of series circuits having a resistive element and a fuse element connected in series and having a different time period for the fuse element to melt by an overcurrent. One end in the parallel circuit may be connected to a first connection point having a reference potential, and another end in the parallel circuit may be connected to a second connection point that is to have a potential higher than the reference potential.

An electrical resistance of the resistive element in at least one of the series circuits connected in parallel may be different from an electrical resistance of the resistive element in at least another one of the series circuits connected in parallel.

A melting characteristic of the fuse element in the at least one of the series circuits may be the same as a melting characteristic of the fuse element in the at least another one of the series circuits.

A melting characteristic of the fuse element in at least one of the series circuits connected in parallel may be different from a melting characteristic of the fuse element in at least another one of the series circuits connected in parallel.

An electrical resistance of the resistive element in the at least one of the series circuits may be the same as an electrical resistance of the resistive element in the at least another one of the series circuits.

The device may further include a determination circuit configured to determine melting of the fuse element.

According to a third aspect of the present invention, there is provided a semiconductor apparatus. The semiconductor apparatus may have the device mounted thereon.

According to a fourth aspect of the present invention, there is provided a gate driver. The gate driver may have the semiconductor apparatus mounted thereon.

According to a fifth aspect of the present invention, there is provided a power module. The power module may have the gate driver mounted thereon.

The summary clause does not necessarily describe all necessary features of the embodiments of the present invention. The present invention may also be a sub-combination of the features described above.

DESCRIPTION OF EXEMPLARY EMBODIMENTS

Hereinafter, the present invention will be described through embodiments of the invention, but the following embodiments do not limit the present invention according to the claims. In addition, not all combinations of the features described in the embodiments necessarily have to be essential to solving means of the invention.

Figure 1:
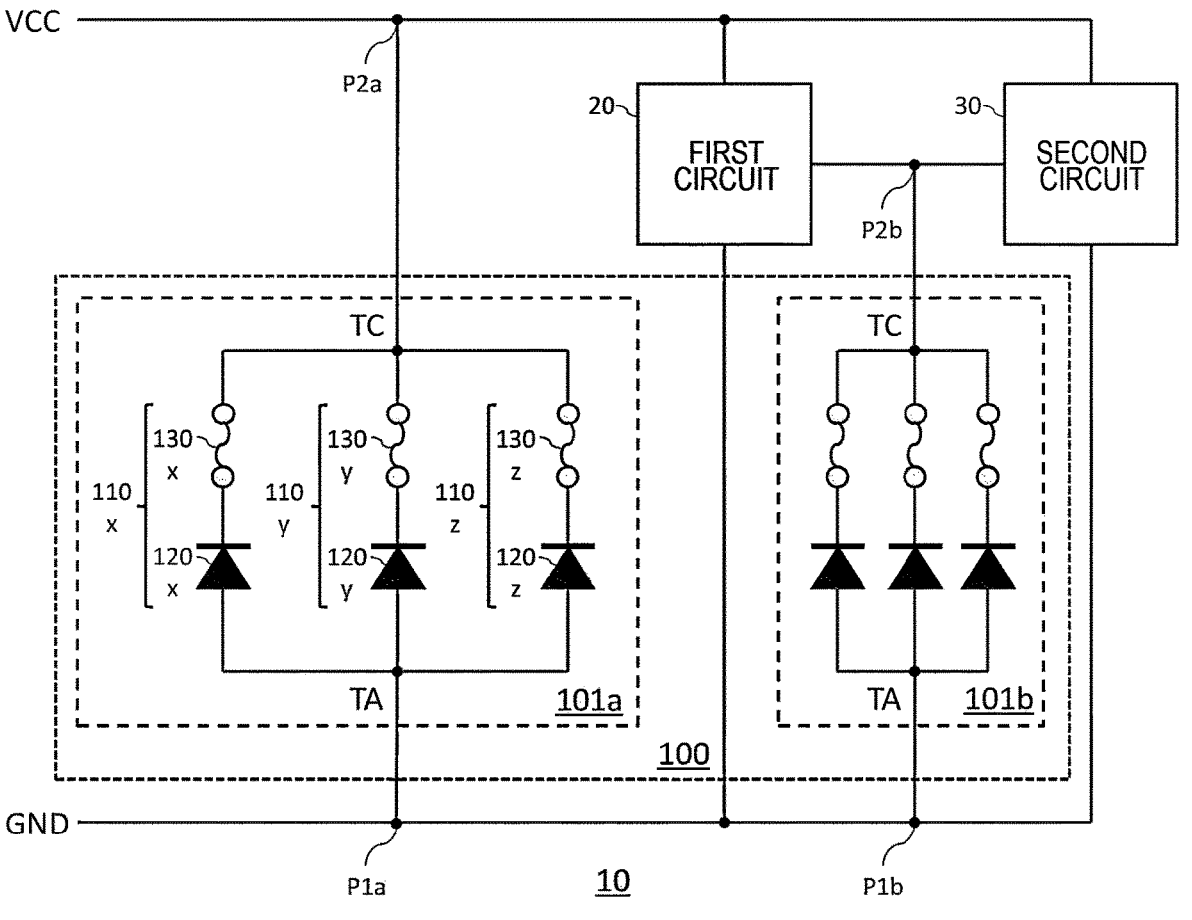
FIG. 1 illustrates an example of an IC 10 on which a device 100 according to the present embodiment is mounted.

FIG. 1 illustrates an example of an IC 10 on which a device 100 according to the present embodiment is mounted. The device 100 according to the present embodiment includes a series circuit in which a rectifying element and a fuse element are connected in series. Then, an anode side of the rectifying element in the series circuit is connected to a reference potential, and a cathode side is connected to a potential higher than the reference potential. Thus, in accordance with the device 100 according to the present embodiment, generation of a negative voltage surge in the IC 10 can be recorded as a history by melting (also including quasi-melting) of the fuse element. Note that "being connected" mentioned herein includes, in addition to a state where a terminal is directly connected, a state where a terminal is indirectly connected via some element or the like. The same also applies hereinafter.

The IC 10 is an integrated circuit in which active elements and passive elements such as a transistor, a diode, a resistor, and a capacitor are integrated on a single substrate. For example, a semiconductor substrate such as silicon may be used as the above-described substrate.

Circuits configured to achieve various functions may be integrated in the IC 10. Hereinafter, in the present embodiment, a case where the IC 10 is a gate driver IC will be described as an example.

A gate driver is a circuit configured to drive a power semiconductor by applying a voltage to a gate. Examples of such a power semiconductor include a metal oxide semiconductor field effect transistor (MOSFET) and an insulated gate bipolar transistor (IGBT), for example. The IC 10 may have such a gate drive function, for example. However, the configuration is not limited to this. The IC 10 may have various functions different from the gate drive function.

The IC 10 includes a first circuit 20, a second circuit 30, and the device 100 according to the present embodiment. That is, a semiconductor apparatus on which the device 100 according to the present embodiment is mounted may be provided, and in particular, a gate driver on which the above-described semiconductor apparatus is mounted may be provided.

In addition, the gate driver may be accommodated in a same package as a so-called intelligent power module (IPM) together with a power semiconductor and a protection circuit. Therefore, a power module on which such a gate driver is mounted may be provided.

In addition, the power module may be used for power conversion by an inverter for driving a motor, a DC-to-DC converter, or the like. Therefore, a power conversion apparatus on which such a power module is mounted may be provided.

Each of the first circuit 20 and the second circuit 30 may be a circuit configured to achieve some of functions that the IC 10 has. As an example, when the IC 10 is a gate driver IC, the first circuit 20 and the second circuit 30 may be at least any of a drive circuit configured to drive a gate of a power semiconductor, a delay circuit, a logic circuit, a protection circuit, and the like.

The device 100 may be built in the IC 10 in order to record the generation of the negative voltage surge in the IC 10 (or the power module, or the power conversion apparatus) as a history.

The device 100 includes a parallel circuit. In the present diagram, a case is illustrated as an example where the device

100 includes a first parallel circuit 101*a* and a second parallel circuit 101*b* (which are collectively referred to as a "parallel circuit 101"). Note that in the present diagram, the case has been illustrated as an example where the device 100 includes two parallel circuits 101, but the configuration is not limited to this. The device 100 may include only one parallel circuit 101, or may include three or more parallel circuits 101.

In the parallel circuit 101, a plurality of series circuits is connected in parallel. In the present diagram, a case is illustrated as an example where a first series circuit 110*x*, a second series circuit 110*y*, and a third series circuit 110*z* (which are collectively referred to as a "series circuit 110") are connected in parallel in the first parallel circuit 101*a*. Since the second parallel circuit 101*b* may be similarly configured as in the first parallel circuit 101*a*, descriptions thereof will be omitted herein. Note that in the present diagram, a case is illustrated as an example where three series circuits 110 are connected in parallel in the parallel circuit 101, but the configuration is not limited to this. In the parallel circuit 101, two series circuits 110 may be connected in parallel, or four or more series circuits 110 may be connected in parallel. In addition, a number of at least one series circuit 110 to be connected in parallel may be different among the plurality of parallel circuits 101.

In the series circuit 110, a rectifying element and a fuse element are connected in series. In the present diagram, a case is illustrated as an example where a first rectifying element 120*x* and a first fuse element 130*x* are connected in series in the first series circuit 110*x*, a second rectifying element 120*y* and a second fuse element 130*y* are connected in series in the second series circuit 110*y*, a third rectifying element 120*z* and a third fuse element 130*z* are connected in series in the third series circuit 110*z*. Herein, the first rectifying element 120*x*, the second rectifying element 120*y*, and the third rectifying element 120*z* are collectively referred to as a "rectifying element 120". In addition, the first fuse element 130*x*, the second fuse element 130*y*, and the third fuse element 130*z* are collectively referred to as a "fuse element 130".

The rectifying element 120 is an element having a rectifying action for allowing a current to flow in only one direction. The rectifying element 120 has a P-N junction. The P-N junction refers to a junction of a P-type semiconductor and an N-type semiconductor in which an electrode of the P-type semiconductor is referred to as an anode, and an electrode of the N-type semiconductor is referred to as a cathode. In the rectifying element 120 described above, when a voltage is applied to a cathode side which is higher than a voltage applied to an anode side (which is also referred to as "applying a reverse bias"), since a depletion layer in a junction portion becomes larger, a current does not flow in an opposite direction. On the other hand, in the rectifying element 120, when a voltage is applied to the anode side which is higher than a voltage applied to the cathode side (which is also referred to as "applying a forward bias"), since the depletion layer in the junction portion becomes smaller (disappears), a current flows in a forward direction.

For example, a diode or the like may be dedicatedly provided as the rectifying element 120 described above. However, the configuration is not limited to this. In general, P-N junctions (for example, a P-N junction included in a transistor and the like) are provided in various positions inside the IC 10 in order to achieve various functions that the IC 10 has. Therefore, such existing P-N junctions may be secondarily utilized as the rectifying elements 120.

The fuse element 130 is an element configured to break a circuit by causing an internal wiring to melt by Joule heating when a current equal to or higher than a rate flows. Such an element is generally used as a protection part configured to protect an electrical circuit from a large current equal to or higher than the rate or as a part for function trimming. In contrast, in the device 100 according to the present embodiment, the fuse element 130 described above is used to record the generation of the negative voltage surge in the IC 10 as a history.

For example, as illustrated in the present diagram, in the series circuit 110, an anode of the rectifying element 120 may configure one end TA of the series circuit 110 (one end on the anode side of the rectifying element 120 in the series circuit 110). In addition, a cathode of the rectifying element 120 may be connected to one end of the fuse element 130. Then, another end of the fuse element 130 may configure another end TC of the series circuit 110 (another end on the cathode side of the rectifying element 120 in the series circuit 110). However, the configuration is not limited to this. For example, the rectifying element 120 and the fuse element 130 may be connected in series in a reverse order. That is, in the series circuit 110, one end of the fuse element 130 may configure the one end TA of the series circuit 110, another end of the fuse element 130 may be connected to the anode of the rectifying element 120, and the cathode of the rectifying element 120 may configure the other end TC of the series circuit 110.

Then, as illustrated in the present diagram, in the first parallel circuit 101a, the one end TA in the series circuit 110 may be connected to a first first-connection point P1a, and the other end TC may be connected to a first second-connection point P2a. Herein, the first first-connection point P1a may be, for example, a connection point having a GND potential in the IC 10. In addition, the first second-connection point P2a may be, for example, a connection point having a VCC potential in the IC 10. Similarly, in the second parallel circuit 101b, the one end TA in the series circuit 110 may be connected to a second first-connection point P1b, and the other end TC may be connected to a second second-connection point P2b. Herein, the second first-connection point P1b may be, for example, a connection point having the GND potential in the IC 10. In addition, the second second-connection point P2b may be, for example, a connection point having a potential between the VCC potential and the GND potential in the IC 10. Herein, the first first-connection point P1a and the second first-connection point P1b are collectively referred to as a "first connection point P1". In addition, the first second-connection point P2a and the second second-connection point P2b are collectively referred to as a "second connection point P2". In this manner, in the device 100, the one end TA on the anode side of the rectifying element 120 in the series circuit 110 is connected to the first connection point P1 having the reference potential, and the other end TC on the cathode side of the rectifying element 120 in the series circuit 110 is connected to the second connection point P2 that is to have a potential higher than the reference potential.

Therefore, at the time of a normal operation, the potential at the second connection point P2 is higher than the potential of the first connection point P1, and a reverse bias is applied to the rectifying element 120, so that a current does not flow to the fuse element 130. However, when a negative voltage surge is generated in the IC 10 due to some abnormality, an inversion phenomenon occurs in which the potential at the first connection point P1 is higher than the potential at the second connection point P2, and a forward bias is applied to the rectifying element 120, so that a current flows to the fuse element 130. Then, when an overcurrent equal to or higher than the rate flows as the above-described current, the fuse element 130 is to melt. That is, the device 100 can record the generation of the negative voltage surge as a history by the melting of the fuse element 130.

In this manner, the device 100 according to the present embodiment includes the series circuit 110 in which the rectifying element 120 and the fuse element 130 are connected in series. Then, the one end TA on the anode side of the rectifying element 120 in the series circuit 110 is connected to the first connection point P1 having the reference potential, and the other end TC on the cathode side of the rectifying element 120 in the series circuit 110 is connected to the second connection point P2 that is to have the potential higher than the reference potential. Thus, in accordance with the device 100 according to the present embodiment, whether the negative voltage surge has been generated in the IC 10 can be found out by the melting of the fuse element 130, so that a judgement material in a failure analysis on the IC 10 can be provided.

Figure 2:
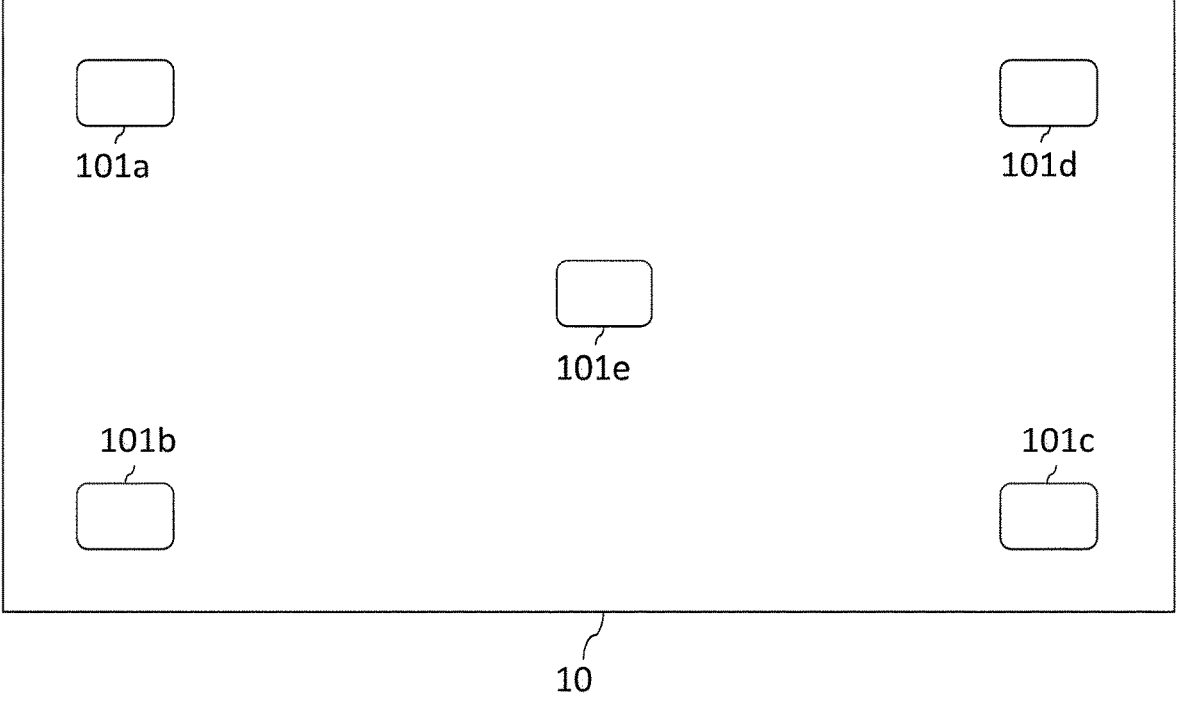
FIG. 2 illustrates an example of a plan view of the IC 10.

FIG. 2 illustrates an example of a plan view of the IC 10. In the present diagram, a case is illustrated as an example where five parallel circuits 101 including the first parallel circuit 101a, the second parallel circuit 101b, a third parallel circuit 101c, a fourth parallel circuit 101d, and a fifth parallel circuit 101e are built in the IC 10. At this time, the parallel circuits 101 may be provided in edge portions of the IC as in the first parallel circuit 101a to the fourth parallel circuit 101d or may be provided in a central portion of the IC as in the fifth parallel circuit 101e. In particular, it is sufficient when the parallel circuits 101 are arranged in the vicinity of a circuit in which a negative voltage surge is likely to be generated inside the IC 10.

Herein, in the parallel circuit 101, as described above, a plurality of series circuits 110 in each of which the rectifying element 120 and the fuse element 130 are connected in series is connected in parallel. At this time, the plurality of series circuit 110 connected in parallel may be configured such that time periods for the fuse elements 130 to melt by an overcurrent are different from each other.

As an example, the first rectifying element 120x, the second rectifying element 120y, and the third rectifying element 120z may be configured to have mutually different rectifying characteristics. As described above, the rectifying element 120 has the P-N junction. Herein, a forward current in the P-N junction depends on a junction area of the P-type semiconductor and the N-type semiconductor. That is, when the junction area of the P-N junction is small, the forward current decreases since a resistance component increases. On the other hand, when the junction area of the P-N junction is large, the forward current increases since the resistance component decreases. In view of the above, in the plurality of series circuits 110 connected in parallel, the rectifying characteristics of the rectifying elements 120 may be set to be different from each other by setting the junction areas of the P-N junctions to be different from each other.

For example, the junction areas of the P-N junctions may be set as follows: the first rectifying element 120x<the second rectifying element 120y<the third rectifying element 120z. In this case, the resistance components are set as follows: the first rectifying element 120x>the second rectifying element 120y>the third rectifying element 120z. Therefore, sizes of the forward currents are set as follows: the first rectifying element 120x<the second rectifying element 120y<the third rectifying element 120z.

At this time, when the melting characteristics of the first fuse element 130x, the second fuse element 130y, and the third fuse element 130z are the same, it is possible to set the time periods for the fuse elements 130 to melt to be different from each other in the first series circuit 110x, the second series circuit 110y, and the third series circuit 110z.

Note that in the above descriptions, the case has been illustrated as an example where the rectifying characteristics of the rectifying elements 120 are set to be different from each other among all the series circuits 110 connected in parallel, but the configuration is not limited to this. It is sufficient when the rectifying characteristic of the rectifying element 120 in at least one of the series circuits 110 connected in parallel is different from the rectifying characteristic of the rectifying element in at least another one of the series circuits 110 connected in parallel. In more detail, it is sufficient when the junction area of the P-N junction in the at least one of the series circuits 110 is different from the junction area of the P-N junction in the at least another one of the series circuits 110. At this time, it is sufficient when the melting characteristic of the fuse element 130 in the at least one of the series circuits 110 is the same as the melting characteristic of the fuse element 130 in the at least another one of the series circuits 110. Thus, in the at least one of the series circuits 110, the time period for the fuse element 130 to melt can be set to be different from that of the at least another one of the series circuits 110.

Note that such a wording is used in the above descriptions that the characteristic or the like is "different", but being "different" mentioned herein means being different on a design specification, but a case of having only a slight difference such as manufacturing tolerances is not included. In addition, such a wording is used in the above descriptions that a characteristic or the like is the "same", but being "same" mentioned herein means being the same on a design specification, and a case of having only a slight difference such as manufacturing tolerances is also included. The same also applies hereinafter.

Figure 3:
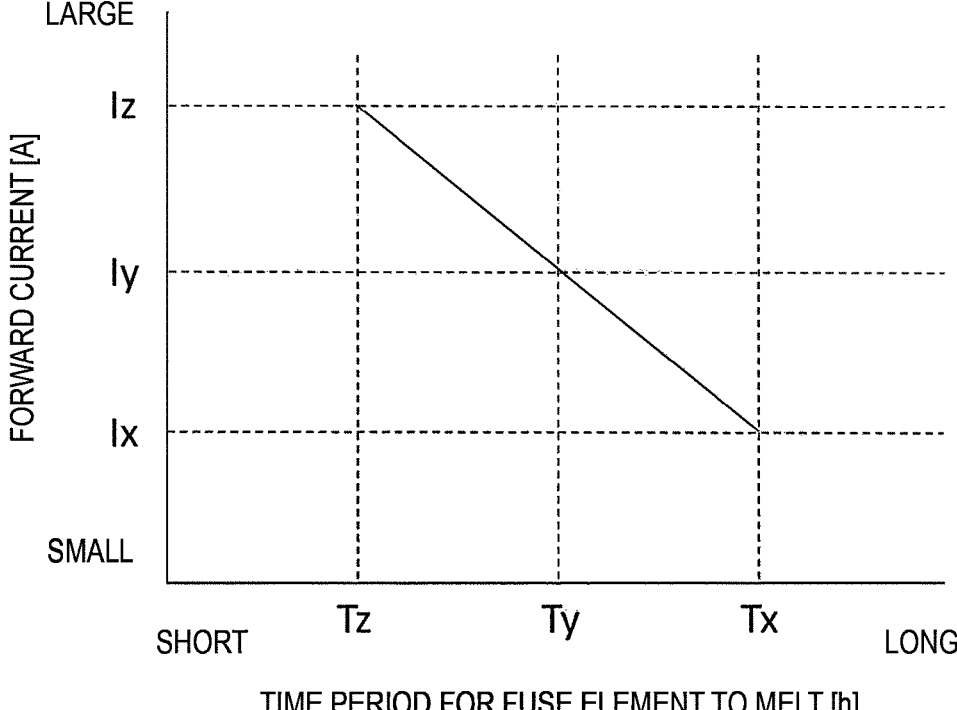
FIG. 3 illustrates an example of a relationship between a time period for a fuse element 130 to melt and a forward current.

FIG. 3 illustrates an example of a relationship between a time period for the fuse element 130 to melt and a forward current. The present diagram illustrates a relationship between a time period for the first fuse element 130x, the second fuse element 130y, and the third fuse element 130z to melt and a forward current when the junction areas of the P-N junctions are set as follows: the first rectifying element 120x<the second rectifying element 120y<the third rectifying element 120z. Note that it is assumed that the melting characteristics of the first fuse element 130x, the second fuse element 130y, and the third fuse element 130z are the same.

A horizontal axis in the present diagram represents a time period for the fuse element 130 to melt, and represents that the time period is shortened to the left and the time period is lengthened to the right. In addition, a vertical axis in the present diagram represents a size of a forward current, and represents that its value is decreased to the bottom and its value is increased to the top.

For example, when attention is focused on the first series circuit 110x, since the junction area of the P-N junction in the first rectifying element 120x is relatively small, a forward current Ix in the first series circuit 110x becomes relatively small. Herein, since the fuse element 130 causes the internal wiring to melt by Joule heating, a time period Tx for the first fuse element 130x to melt becomes relatively long. On the other hand, when attention is focused on the third series circuit 110z, since the junction area of the P-N junction in the third rectifying element 120z is relatively large, a forward current Iz in the third series circuit 110z becomes relatively large. Then, a time period Tz for the third fuse element 130z to melt becomes relatively short. With regard to the second series circuit 110y, a relationship between the first series circuit 110x and the third series circuit 110z is established.

Herein, for example, when the first fuse element 130x has melted and the second fuse element 130y and the third fuse element 130z have not melted, it can be judged that a relatively small current has flown for a long time period. Similarly, when the third fuse element 130z has melted and the first fuse element 130x and the second fuse element 130y have not melted, it can be judged that a relatively large current has flown for a short time period. Therefore, in the failure analysis on the IC 10, a current amount of the negative voltage surge generated in the IC 10 and an elapsed time period can be predicted based on such a judgement material. In this manner, in accordance with the device 100 according to the present embodiment, since the plurality of series circuits 110 connected in parallel is configured to have the mutually different time periods for the fuse elements 130 to melt by the overcurrent, it is possible to record the generation of the negative voltage surge as a history such that the current amount by the negative voltage surge and the elapsed time period can be predicted.

Note that in the above descriptions, the case has been illustrated as an example where in the plurality of series circuits 110 connected in parallel, the time periods for the fuse elements 130 to melt differ from each other by setting the different rectifying characteristics of the rectifying elements 120, in more detail, the different junction areas of the P-N junctions. However, the configuration is not limited to this. In the plurality of series circuits 110 connected in parallel, the time periods for the fuse elements 130 to melt may differ from each other by setting the different melting characteristics of the fuse elements 130.

That is, the melting characteristic of the fuse element 130 in at least one of the series circuits 110 connected in parallel may be different from the melting characteristic of the fuse element 130 in at least another one of the series circuits 110 connected in parallel. At this time, the rectifying characteristic of the rectifying element 120 in the at least one of the series circuits 110 may be the same as the rectifying characteristic of the rectifying element 120 in the at least another one of the series circuits 110. In other words, in the plurality of series circuits 110 connected in parallel, the time periods for the fuse elements 130 to melt may differ from each other by setting the mutually different melting characteristics of the fuse elements 130 while the forward current with the same size flows by setting the same rectifying characteristics of the rectifying elements 120.

Figure 4:
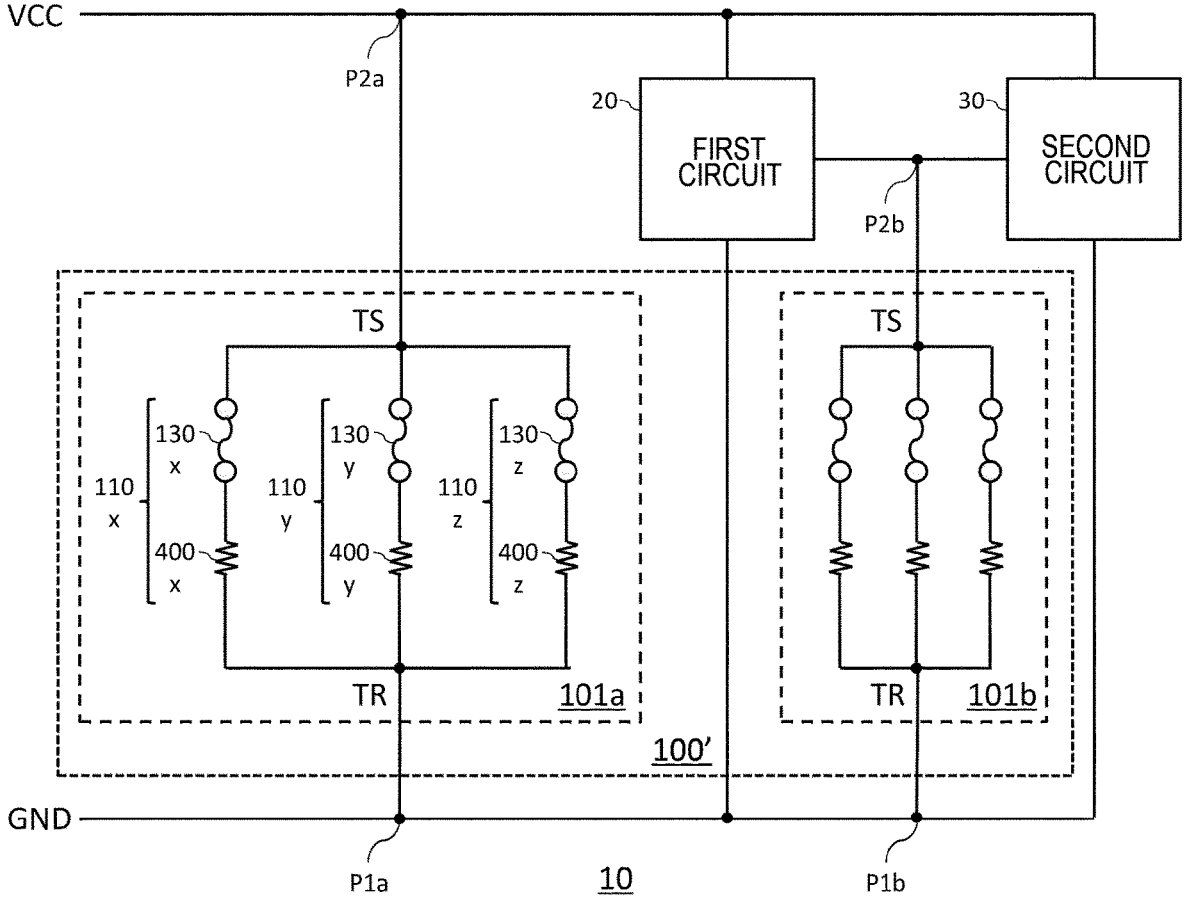
FIG. 4 illustrates an example of the IC 10 on which a device 100' according to a first modified example of the present embodiment is mounted.

FIG. 4 illustrates an example of the IC 10 on which a device 100' according to a first modified example of the present embodiment is mounted. In FIG. 4, a member having a same function and configuration as FIG. 1 is assigned with a same reference sign, and descriptions will be omitted below except for a difference. According to the embodiment described above, the case has been illustrated as an example where the rectifying element 120 and the fuse element 130 are connected in series in the series circuit 110. In this case, at the time of a normal operation, an advantage is attained that the series circuit 110 does not affect the IC 10 at all since the reverse bias is applied to the rectifying element 120. However, in such an embodiment, since a current direction is limited to one direction, it is only possible to deal with the generation of the surge in one direction (in the above descriptions, a negative voltage direction).

In view of the above, in a first modified example, a resistive element 400 is used instead of the rectifying element 120. That is, the resistive element 400 and the fuse element 130 are connected in series in the series circuit 110. In the present diagram, a case is illustrated as an example where a first resistive element 400*x* and the first fuse element 130*x* are connected in series in the first series circuit 110*x*, a second resistive element 400*y* and the second fuse element 130*y* are connected in series in the second series circuit 110*y*, and a third resistive element 400*z* and the third fuse element 130*z* are connected in series in the third series circuit 110*z*. Herein, the first resistive element 400*x*, the second resistive element 400*y*, and the third resistive element 400*z* are collectively referred to as the resistive element 400.

The resistive element 400 is an element having an electrical resistance. For example, a resistor or the like may be dedicatedly provided as the resistive element 400 described above. However, the configuration is not limited to this. In general, wirings are provided in various positions inside the IC 10 in order to achieve various functions that the IC 10 has. Therefore, such existing wirings may be secondarily utilized as the resistive elements 400.

For example, as illustrated in the present diagram, in the series circuit 110, one end of the resistive element 400 may configure one end TR of the series circuit 110 (which is also referred to as one end of the parallel circuit 101). In addition, another end of the resistive element 400 may be connected to one end of the fuse element 130. Then, another end of the fuse element 130 may configure another end TS of the series circuit 110 (which is also referred to as another end of the parallel circuit 101). However, the configuration is not limited to this. For example, the resistive element 400 and the fuse element 130 may be connected in series in a reverse order. That is, in the series circuit 110, one end of the fuse element 130 may configure the one end TR of the series circuit 110, another end of the fuse element 130 may be connected to one end of the resistive element 400, and another end of the resistive element 400 may configure the other end TS of the series circuit 110.

Then, as illustrated in the present diagram, the one end TR in the first parallel circuit 101*a* may be connected to the first first-connection point P1*a*, and the other end TS may be connected to the first second-connection point P2*a*. Similarly, the one end TR in the second parallel circuit 101*b* may be connected to the second first-connection point P1*b*, and the other end TS may be connected to the second second-connection point P2*b*. In this manner, in the device 100', the one end TR in the parallel circuit 101 is connected to the first connection point P1 having the reference potential, and the other end in the parallel circuit 101 is connected to the second connection point P2 that is to have a potential higher than the reference potential.

At this time, in the device 100' according to the first modified example too, it is sufficient when the plurality of series circuits 110 connected in parallel is configured such that the time periods for the fuse elements 130 to melt by the overcurrent differ from each other. That is, the device 100' according to the first modified example may include the parallel circuit 101 in which the plurality of series circuits 110 is connected in parallel, each of the plurality of series circuits 110 having the resistive element 400 and the fuse element 130 connected in series and having the different time period for the fuse element 130 to melt by the overcurrent.

As an example, electrical resistances of the first resistive element 400*x*, the second resistive element 400*y*, and the third resistive element 400*z* may be configured to be different from each other. For example, the electrical resistances may be set as follows: the first resistive element 400*x*>the second resistive element 400*y*>the third resistive element 400*z*. In this case, sizes of the forward currents are set as follows: the first resistive element 400*x*<the second resistive element 400*y*<the third resistive element 400*z*.

At this time, when the melting characteristics of the first fuse element 130*x*, the second fuse element 130*y*, and the third fuse element 130*z* are the same, it is possible to set the time periods for the fuse elements 130 to melt to be different from each other in the first series circuit 110*x*, the second series circuit 110*y*, and the third series circuit 110*z*.

Note that in the above descriptions, the case has been illustrated as an example where the electrical resistances of the resistive elements 400 are set to be different from each other among all the series circuits 110 connected in parallel, but the configuration is not limited to this. It is sufficient when the electrical resistance of the resistive element 400 in at least one of the series circuits 110 connected in parallel is different from the electrical resistance of the resistive element 400 in at least another one of the series circuits 110 connected in parallel. At this time, it is sufficient when the melting characteristic of the fuse element 130 in the at least one of the series circuits 110 is the same as the melting characteristic of the fuse element 130 in the at least another one of the series circuits 110. Thus, in the at least one of the series circuits 110, the time period for the fuse element 130 to melt can be set to be different from that of the at least another one of the series circuits 110.

Note that in the above descriptions, the case has been illustrated as an example where in the plurality of series circuits 110 connected in parallel, the time periods for the fuse elements 130 to melt differ from each other by setting the different electrical resistances of the resistive elements 400. However, the configuration is not limited to this. In the plurality of series circuits 110 connected in parallel, the time periods for the fuse elements 130 to melt may differ from each other by setting the different melting characteristics of the fuse elements 130.

That is, the melting characteristic of the fuse element 130 in at least one of the series circuits 110 connected in parallel may be different from the melting characteristic of the fuse element 130 in at least another one of the series circuits 110 connected in parallel. At this time, the electrical resistance of the resistive element 400 in the at least one of the series circuits 110 may be the same as the electrical resistance of the resistive element 400 in the at least another one of the series circuits 110. In other words, in the plurality of series circuits 110 connected in parallel, the time periods for the fuse elements 130 to melt may differ from each other by setting the mutually different melting characteristics of the fuse elements 130 while the current with the same size is caused to flow by setting the same electrical resistances of the resistive elements 400.

In this manner, in the device 100' according to the first modified example, the resistive element 400 is used instead of the rectifying element 120. Therefore, since the current direction is not limited to one direction, it is also possible to deal with the generation of the surge in a positive voltage direction in addition to the negative voltage direction.

Figure 5:
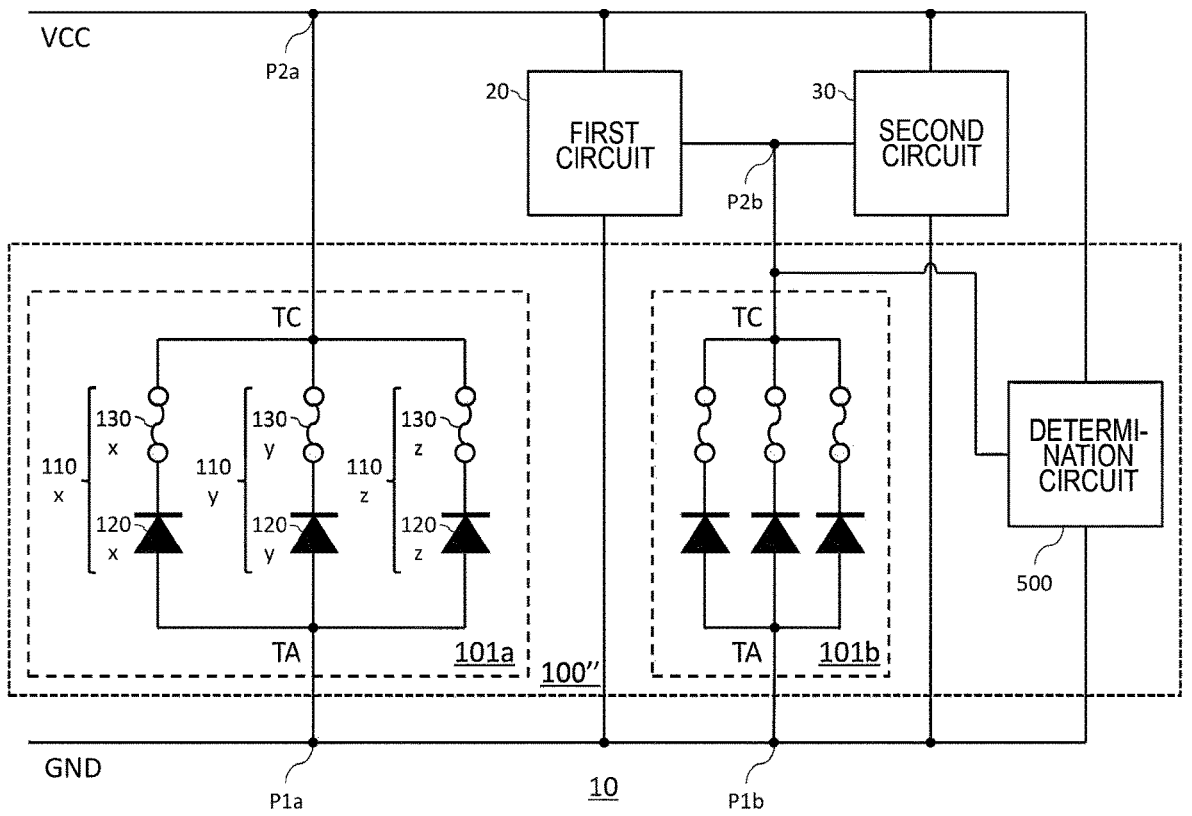
FIG. 5 illustrates an example of the IC 10 on which a device 100" according to a second modified example of the present embodiment is mounted.

FIG. 5 illustrates an example of the IC 10 on which a device 100" according to a second modified example of the present embodiment is mounted. In FIG. 5, a member having a same function and configuration as FIG. 1 is assigned with a same reference sign, and descriptions will be omitted below except for a difference. The device 100" according to the second modified example has a function of determining melting of a fuse element in addition to the function that the device 100 according to the above-described embodiment has. The device 100" according to the second modified example further includes a determination circuit 500.

The determination circuit 500 is configured to determine melting (also including quasi-melting) of the fuse element 130. In the present diagram, a case is illustrated as an example where the determination circuit 500 is connected in parallel between the second first-connection point P1*b* and the second second-connection point P2*b*. In such a case, the determination circuit 500 is configured to determine the melting of the fuse element 130, for example, by measuring an inter-terminal voltage between the first connection point P1 and the second connection point P2. In more detail, it may be determined that the fuse element 130 has melted when the measured inter-terminal voltage is different from an inter-terminal voltage in a case where the fuse element 130 has not melted.

However, the configuration is not limited to this. The determination circuit 500 may be connected in series between the first connection point P1 and the second connection point P2. In such a case, the determination circuit 500 may determine the melting of the fuse element 130, for example, by measuring an inter-terminal current between the first connection point P1 and the second connection point P2. In more detail, it may be determined that the fuse element 130 has melted when the measure inter-terminal current is different from an inter-terminal current in a case where the fuse element 130 has not melted.

Note that in the determination circuit 500 described above, a plurality of thresholds to be compared with the measured value may be provided. That is, the determination circuit 500 may determine how many of the fuse elements 130 have melted by storing four thresholds in advance from experimental data or the like corresponding to a case where none of the fuse elements 130 have melted, a case where one fuse element has melted, a case where two fuse elements have melted, and a case where all of the fuse elements have melted, and comparing the measured value with the plurality of these thresholds.

In this manner, the device 100" according to the second modified example further includes the determination circuit 500 configured to determine the melting of the fuse element 130. Thus, in accordance with the device 100" according to the second modified example, labor for separately analyzing the melting of the fuse element 130 can be saved.

While the embodiments of the present invention have been described, the technical scope of the present invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the present invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10 IC
20 first circuit
30 second circuit
100 device
101 parallel circuit
101*a* first parallel circuit
101*b* second parallel circuit
101*c* third parallel circuit
101*d* fourth parallel circuit
101*e* fifth parallel circuit
110 series circuit
110*x* first series circuit
110*y* second series circuit
110*z* third series circuit
120 rectifying element
120*x* first rectifying element
120*y* second rectifying element
120*z* third rectifying element
130 fuse element
130*x* first fuse element
130*y* second fuse element
130*z* third fuse element
400 resistive element
400*x* first resistive element
400*y* second resistive element
400*z* third resistive element
500 determination circuit.

What is claimed is:

1. A device comprising:

a parallel circuit in which a plurality of series circuits is connected in parallel, each of the plurality of series circuits having a resistive element and a fuse element connected in series and having a different time period for the fuse element to melt by an overcurrent, wherein one end in the parallel circuit is connected to a first connection point having a reference potential, and another end in the parallel circuit is connected to a second connection point that is to have a potential higher than the reference potential; and a determination circuit connected between the first connection point and the second connection point configured to count the number of the fuse elements in the series circuits connected in parallel that have melted based on comparing voltage or current measurements with a plurality of threshold values, each of the plurality of threshold values based on a case where a cumulative number of the fuse elements, each having different time period to melt, have melted.

2. The device according to claim 1, wherein an electrical resistance of the resistive element in at least one of the series circuits connected in parallel is different from an electrical resistance of the resistive element in at least another one of the series circuits connected in parallel.

3. The device according to claim 2, wherein a melting characteristic of the fuse element in the at least one of the series circuits is the same as a melting characteristic of the fuse element in the at least another one of the series circuits.

4. The device according to claim 1, wherein a melting characteristic of the fuse element in at least one of the series circuits connected in parallel is different from a melting characteristic of the fuse element in at least another one of the series circuits connected in parallel.

5. The device according to claim 4, wherein an electrical resistance of the resistive element in the at least one of the series circuits is the same as an electrical resistance of the resistive element in the at least another one of the series circuits.

6. A semiconductor apparatus on which the device according to claim 1 is mounted.

7. A gate driver on which the semiconductor apparatus according to claim 6 is mounted.

8. A power module on which the gate driver according to claim 7 is mounted.

9. A device comprising:

a parallel circuit in which a plurality of series circuits is connected in parallel, each of the plurality of series circuits having a resistive element and a fuse element connected in series and having a different time period for the fuse element to melt by an overcurrent, wherein one end in the parallel circuit is connected to a first connection point having a reference potential, and another end in the parallel circuit is connected to a second connection point that is to have a potential higher than the reference potential, and a melting characteristic of the fuse element in at least one of the series circuits connected in parallel is the same as a melting characteristic of the fuse element in at least another one of the series circuits connected in parallel; and a determination circuit connected between the first connection point and the second connection point configured to count the number of the fuse elements in the series circuits connected in parallel that have melted based on comparing voltage or current measurements with a plurality of threshold values, each of the plurality of threshold values based on a case where a cumulative number of the fuse elements, each having the different time period to melt, will have melted.

\*   \*   \*   \*   \*